United States Patent [19]

Francisco, Jr. et al.

[11] Patent Number: 5,072,416
[45] Date of Patent: Dec. 10, 1991

[54] METHOD AND APPARATUS FOR CALIBRATING A FLOWMETER USING A MASTER METER AND A PROVER

[75] Inventors: Edward E. Francisco, Jr., Paradise Valley; Gary D. Cohrs, Tempe; Samuel H. Smith, Phoenix, all of Ariz.

[73] Assignee: Calibron Systems, Inc., Scottsdale, Ariz.

[21] Appl. No.: 497,729

[22] Filed: Mar. 19, 1990

Related U.S. Application Data

[63] Continuation-in-part of Ser. No. 465,836, Jan. 16, 1990, abandoned.

[51] Int. Cl.$^5$ .................... G01C 25/00; G01F 15/02; G01F 25/00; G01F 1/00
[52] U.S. Cl. .................... 364/571.01; 73/1 H; 73/3; 73/861.01; 364/510
[58] Field of Search .............. 364/570, 571.01, 571.02, 364/509, 510; 73/3, 861, 861.01, 861.03, 1 R, 1 H

[56] References Cited

U.S. PATENT DOCUMENTS

| 3,635,084 | 1/1972 | Lamphere | 73/861.03 |
| 4,253,156 | 2/1981 | Lisle et al. | 364/510 X |
| 4,419,898 | 12/1983 | Zanker et al. | 364/510 X |
| 4,566,307 | 1/1986 | Boykin | 73/3 |
| 4,649,734 | 3/1987 | Hillburn | |
| 4,821,557 | 4/1989 | Beeson | 73/3 |
| 4,827,430 | 5/1989 | Aid et al. | 364/510 |
| 4,885,943 | 12/1989 | Tootell et al. | 364/510 X |

Primary Examiner—Parshotam S. Lall
Assistant Examiner—E. J. Pipala
Attorney, Agent, or Firm—Christie, Parker & Hale

[57] ABSTRACT

A double cycle prover is used to calibrate meters which require long proving runs. A small volume or piston prover and a master flowmeter, are coupled in series with the meter under test, then the master flowmeter is calibrated against the small volume prover, and the meter under test is calibrated against the master flowmeter. A signal processor combines the proving cycles, to relate the small volume prover to the meter under test. A density meter is connected to the flow channel, if the meter under test is a mass flowmeter, and the signal processor uses the density measurement to relate the mass flow measurement of the meter under test with the volume flow measurement of the master flowmeter.

22 Claims, 1 Drawing Sheet

METHOD AND APPARATUS FOR CALIBRATING A FLOWMETER USING A MASTER METER AND A PROVER

CROSS-REFERENCE TO RELATED APPLICATIONS

This is a continuation-in-part of application Ser. No. 07/465,836, field 01/16/90 now abandoned.

FIELD OF THE INVENTION

The present invention relates to the field of flowmeter provers and, in particular, to a prover system for large flow volumes.

BACKGROUND OF THE INVENTION

A variety of provers for accurately calibrating a flowmeter are known. For the best accuracy, it is essential that flow measurement devices be proven under actual operating conditions. This is typically done by installing a piston or ball prover in line with the flow measuring device which is to be proven. There are at least two types of meters, however, which do not lend themselves to this type of a proving system. One type of meter is a meter with a slow response time, for example a coriolis mass flowmeter. A coriolis meter requires a set amount of time for acquiring and filtering data updates or flow rate changes. The update is added to the previous information for the current output indicating the flow rate. Five tenths to five seconds may be required for a change in flow rate to be fully registered at the meter's output. As a result, a coriolis meter can only be accurately proven when the flow rate changes are allowed to average each other out. The large fluid volume required to obtain an accurate average signal makes conventional proving equipment unusable. A prover large enough to obtain a valid measurement would be unacceptably large. Other meters have an inconsistent response time. This is a characteristic, for example, of a vortex shedding meter. A vortex shedding meter has an inconsistent pulse frequency when measured over short periods. This is caused by random turbulence even when the flow rate is consistent. However, when the output pulses are averaged over a longer period of time, the average flow rate and total flow is very accurate. Again, the large fluid volume required to obtain the required certainty, makes conventional prover equipment unusable. One approach has been to use several passes of a small volume prover and average the results, however, data variations between each pass are missed and the small volume perturbs the flow rate. As a result, there is a need for a prover system with a long calibration cycle yet, the accuracy traceability of a small volume prover.

At present turbine and other types of flowmeters accurately calibrated in a lab are used as master or transfer provers with long calibration cycles. A turbine flowmeter can provide a calibration cycle as long as desired. However, the accuracy of the calibration performed in situ using a turbine flowmeter calibrated in the lab is limited due to differences between the lab and the test site in the fluid, its temperature, its flow rate and its flow dynamics. Inaccuracies also arise when the turbine meter is transported.

SUMMARY OF THE INVENTION

The present invention allows the meter under test to be very accurately calibrated by using a master meter which itself has been calibrated, under virtually identical conditions, with a high accuracy, low volume prover. The invention is valuable for proving any flowmeter which requires a long proving cycle.

One embodiment of the invention is a method for proving the meter. A master meter and a prover are coupled in the fluid channels, in series with the meter under test. The master meter is proven against the prover and a K factor is calculated for the master meter. The meter under test is proven against the master meter. A K factor for the meter under test is calibrated using the K factor for the master meter. Preferably, the master meter is proven against the prover before and after proving the meter under test, and the K factor for the meter under test is calculated using an average of the master meter K factors. In another embodiment, the meter under test measures mass flow, and the master meter measures volume flow. The method then comprises measuring the density of the fluid flowing in the fluid channel and using the density of the fluid in calibrating the K factor of the meter under test. The density of the fluid is preferably measured while the meter under test is being proven. The step rf proving the meter and calculating the K factor for the master meter is preferably repeated until a predetermined number of repetitions yield a K factor within a predefined tolerance. The step of proving the meter under test and calculating a K factor, for the meter under test, is also repeated until a second predetermined number of repetitions yields a K factor within a second predefined tolerance.

The invention also comprises an apparatus for proving a meter in a flow channel which has a master meter for proving the meter under test coupled in series within the flow chamber with the meter under test, a prover for proving the master meter coupled in series in the flow channel with the master meter, and a signal processor coupled to the prover, the master meter and the meter under test for adjusting the results of proving the meter under test using the results of proving the master meter. In another embodiment, the meter under test measures mass flow, and the master meter and prover measure volume flow. The invention includes a density meter coupled to the fluid channel, for measuring the density of the fluid and providing a signal to the signal processor for use in proving the meter under test. The prover is preferably a piston prover small volume prover such as a, and the meter is preferably a turbine flowmeter. The density meter is preferably calibrated with a picnometer.

DETAILED DESCRIPTION OF THE INVENTION

Figure 1:
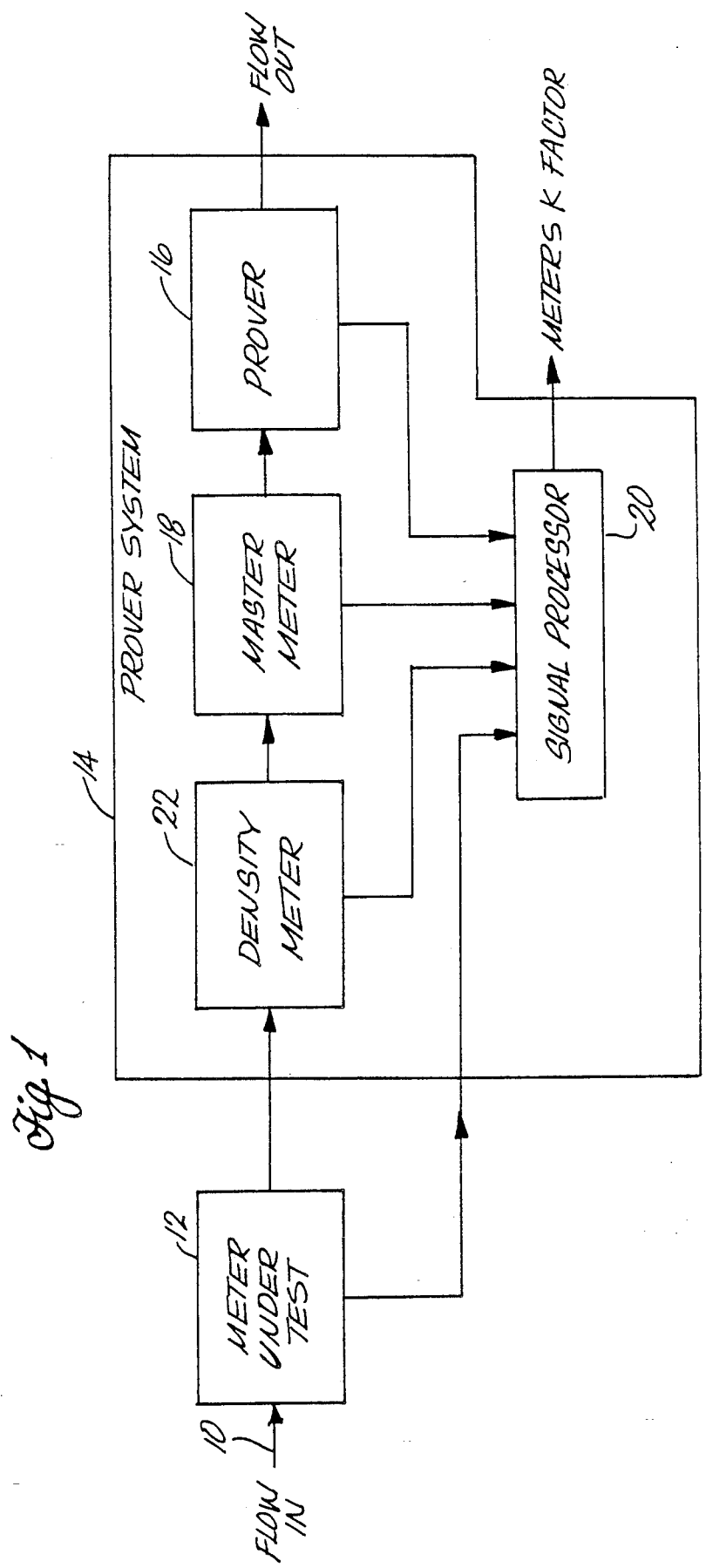
FIG. 1 is a block diagram showing the connections between the parts in accordance with the present invention.

The present invention is represented schematically, in FIG. 1. There is a pipe line 10 through which fluid, the flow rate of which is to be measured flows. The method can be applied to most any fluid including fuel and crude oils, gases and liquified natural gas. The fluid flows first through the meter under test 12. This could be a coriolis mass flowmeter or vortex shedding meter, or any other type oi meter which is not well suited for calibration using small volume piston provers. Generally, meter 12 has a slow response to changing line conditions and/or has a cyclic response variation with a large period. From the meter under test, the fluid flows into a prover system 14 of the present invention. The prover system includes a conventional, small volume prover 16, preferably a piston prover, of the type disclosed, for example, in U.S. Pat. No. 4,152,922, which is incorporated herein by reference, a conventional flowmeter, which serves as the master meter 18, for example a turbine flowmeter, and a signal processor 20, for interpreting the signals received from the meter under test, the master meter and the prover. Master meter 18 responds rapidly to flow rate changes and gives a steady, i.e. noncyclic response, so it can be proven with a small fluid volume. Any meter with a repeatable fast response may be used including, for example, mechanical positive displacement meters. If a mass flowmeter is being calibrated, and tile prover and master meter are volume flowmeters, then a density meter 22 is used. Knowing the density of the fluid flowing through the fluid channel 10 allows the volume flow measurement made by the master meter 18 to be converted into a mass flow for comparison against the mass flowmeter under test. All the described components are used together at a common site.

Once the prover system is coupled in the line 10 in series with the meter under test, the prover system is operated by first proving the master meter 18. The prover 16, is preferably a piston prover and the master meter a turbine flowmeter. The turbine flowmeter produces electrical pulses in proportion to the volume flowing through it. The prover also produces pulses indicating the volume flow rate through the prover. The techniques and apparatus needed for calibrating a flowmeter using a piston prover, are well known and are described for example in U.S. Pat. No. 4,152,922. The pulses from the master meter 18 and the prover 16 are compared and analyzed in the signal processor, which then calculates a K factor for the master meter. The K factor relates the master meter's flow rate measurement to the flow rate measured by the prover. The K factor is retained by the signal processor for later processing. Once the master meter K factor is determined, the meter under test 12 is proven against the master meter. While the proving cycle of the piston prover 16 only lasts as long as the volume of the proving cylinder is large, with a conventional flowmeter, for example a turbine flowmeter, a proving cycle can run as long as desired.

To calibrate the meter under test, the meter under test 12 and the master meter 18 simultaneously measure the same flow through the flow channel producing pulses in response to the flow received by the signal processor. After a period of time long enough for the inconsistency, cyclicity, and delays of the output pulses of the meter under test to average out, the proving cycle ends. The signal processor then compares the pulses received from the meter and the meter under test and calculates a K factor for the meter under test.

The K factor for the meter under test is calculated taking the master meter's K factor into consideration. The K factor is given by:

$$K_t = (N_m/N_t)K_m$$

where $K_t$ is the K factor of the meter under test, $K_m$ is the K factor of the master meter, $N_m$ is the number of pulses produced by the master meter during the proving cycle, and $N_t$ is the number of pulses produced by the meter under test during the proving cycle. The formula assumes that the master meter's pulses and the meter under test's pulse are intended to correspond to the same volume of flow. If this is not the case, then the difference must be compensated for.

The K factor for the master meter is determined by the piston prover providing cycle using:

$$K_m = (N_{ml}/W)$$

where $N_{ml}$ is the number of pulses produced by the master meter during the piston prover proving cycle, and W is the mass or volume of fluid that is displaced by the piston prover during a proving cycle.

If a mass flowmeter, for example a coriolis mass flowmeter, is used, the density meter 22 must also be actuated during the proving cycle for the meter under test. A picnometer is preferably used to make the density reading traceable to an established standard. A picnometer is a container which has a traceable volume, containing a sample of fluid from the pipeline at the temperature and pressure of the line, which is then weighed. Using traceable weights to determine the density, the density meter produces a signal to the signal processor, which the signal processor uses to relate the master meter's volume flow measurement, to the meter under test's mass flow measurement. It is preferred that the density meter monitor the density of the fluid flowing through the flow channel during the proving cycle. The pressure, temperature, and density of the fluid can vary from time to time, so that measuring the density as the proving cycle is being run provides the most accurate correlation between the mass actually measured and the volume actually measured.

The accuracy of the invention can be further enhanced by taking the pressure and temperature of the fluid into consideration. Preferably, the fluid temperature and pressure are measured within the small volume prover, within the master meter, within the meter under test and within the density meter. If a metal cased density meter is used, the temperature of the metal casing can be measured instead of the temperature of the fluid within the meter. The temperature of key parts of the small volume prover, expansions and contractions of which may affect the flow rate measurements are preferably measured also. These temperature and pressure measurements are factored into the flow rate measurements using techniques well known in the art.

The best accuracy would be obtained by determining the turbine meter K's factor at the same time that the K factor of the meter under test is determined. This is normally not practical, however. It is presently preferred that the K factor of the master meter be determined immediately before, and immediately after, the meter under test is compared against the master meter. When the K factor of the master meter changes during use, an average of the K factor before and after a proving cycle gives a good approximation of the actual K factor of the master meter during the proving cycle. The average can be weighted tc emphasize either the initial or final master meter K factor calculation, depending upon the circumstances of the test.

Typically, a flowmeter calibration must conform to specific uncertainty standards. Compliance with these standards can be shown by the repeatability of a K factor determination. By comparing the results of successive K factor calculations, the uncertainty or tolerance of the K factor calculation can be estimated. When a calibration must be performed to within a certain tolerance, it is preferred that the proving cycles of the master meter with the piston prover be repeated until the K factor determined from each proving cycle comes within the desired tolerance. Typically some number, for example 5, proving cycles must be performed in which the K factor remains within the specified predetermined tolerance, for example one part in ten thousand. After the master meter K factor is repeatable to a sufficient degree of tolerance, the meter under test is proven against the master meter. Again proving cycles are repeated until the results are sufficiently repeatable, for example, until a series of five consecutive proving cycles yields a K factor within the desired tolerance of one part in five thousand.

The proving system of the present invention, allows in situ proving of a flowmeter under test and the master meter for preforming the proof. Any inaccuracy due to transporting the master meter and to variations in fluid temperature, fluid type, the amount of flow, and the flow stream are eliminated because the master meter is proven in the same fluid line as the meter under test at nearly the same time. The present invention allows flowmeters which require large proving flow volumes to be accurately calibrated in situ.

Human operation of the present invention can be simplified if the signal processor 20 assumes more functions than receiving data and processing it. The signal processor can include a microcomputer with all of the inputs mentioned above including temperature and pressure information, plus outputs to control the action of the small volume prover 16 and the master meter 18. The microcomputer can be programmed to repeat proving cycles until the uncertainty standards have been reached or to display the uncertainties in a measurement after a predetermined number of proving cycles.

While only a few embodiments have been discussed above, a large number of variations and modifications can be made to the present invention without departing from its spirit and scope. The inventor intends in no way to abandon these adaptations and modifications.

What is claimed is:

1. A method for proving a meter under test in situ comprising:
    coupling a master meter and a prover in a fluid channel in series with the meter under test;
    proving the master meter against the prover;
    calculating a K factor for the master meter;
    proving the meter under test against the master meter; and
    calculating a K factor for the meter under test using the K factor for the master meter.

2. Method cf claim 1 wherein the steps of proving the master meter and calculating a K factor for the master meter are performed before and after the step of proving the meter under test and wherein the step of calculating a K factor for the meter under test comprises using an average of the master meter K factors.

3. The method of claim 1 wherein the meter under test measures mass flow, and the master meter measures volume flow comprising:
    measuring the density of the fluid flowing in the fluid channel; and
    using the density of the fluid in calibrating the K factor of the meter under test.

4. The method of claim 3 wherein the density of the fluid is measured while the meter under test is being proven and comprising using the density measurements to correct for the K factor for the meter under test.

5. The method of claim 1 wherein the prover's proving cycle measures a predetermined volume of flow and wherein the meter under test has a response to flow rate change which is slow in comparison to the time interval predetermined volume of a proving cycle to flow through the meter under test comprising:
    using a master meter having a response to flow rate changes which is fast in comparison to the time interval required for the volume of a proving cycle to flow through the meter under test.

6. The method of claim 1 wherein the prover's proving cycle measures a predetermined volume of flow and wherein the meter under test has a response to the flow rate which is inconsistent for the time period required for the predetermined volume of the proving cycle to flow through the meter under test comprising using a master meter having a response to the flow rate which is consistent for the time period required for the volume of the proving cycle to flow through the meter under test.

7. The method of claim 1 wherein the prover is a piston prover.

8. The method of claim 1 wherein the master meter is a turbine flowmater.

9. The method of claim 1 comprising the step of repeating the steps of proving the master meter and calculating a K factor for the master meter until a predetermined number of repetitions yields a K factor within a predefined tolerance.

10. The method of claim 1 comprising the step of repeating the steps of proving the meter under test and calculating a K factor for the meter under test until a predetermined number of repetitions yields a K factor within a predefined tolerance.

11. The method of claim 1 wherein the meter under test has an inconsistent response to the flow rate over short periods of time.

12. Apparatus for determining the K factor of a meter under test in its flow channel wherein the tested meter produces an output signal in response to the flow rate which it measures comprising:
    a master meter coupled in series in the flow channel with the meter under test for proving the meter under test, the master meter producing an output signal in response to the flow rate which it measures;
    a prover coupled in series in the flow channel with the master meter for proving the master meter, the prover producing an output signal in response to the flow rate which it measures; and
    a signal processor for receiving the output signals produced by the meter under test, the master meter and the prover, calculating a K factor for the master meter, and using the master meter K factor to calculate a K factor for the meter under test.

13. Apparatus according to claim 12 wherein the meter under test measures mass flow, and the master meter and prover measure volume flow comprising:
    a density meter coupled to the fluid channel for measuring the density of the fluid and providing a signal to the signal processor for use in proving the meter under test.

14. Apparatus of claim 12 wherein the meter under test has a slow response to flow rate changes as compared to the prover, and the master meter has a response to flow rate changes which is at least as fast as the prover's response to flow rate changes.

15. Apparatus of claim 12 wherein the output signal produced by the meter under test is uneven in response to an even flow rate, and the output signal produced by the master meter is more even in comparison thereto.

16. Apparatus of claim 12 wherein the prover is a piston prover.

17. Apparatus of claim 12 wherein the master meter is a turbine flowmeter.

18. A method for calibrating a flowmeter under test comprising the following steps performed in the order recited at a common site:
   connecting the flowmeter under test in series with a master flowmeter that has a faster response than the flowmeter under test;
   determining the K-factor of the master flowmeter with a small volume prover; and
   comparing the responses of the flowmeters to fluid flow therethrough to calculate the K-factor of the flowmeter under test.

19. The method of claim 18, in which the connecting step connects a master flowmeter that is a turbine flowmeter.

20. The method of claim 19, in which the flowmeter under test is a coriolis meter.

21. A method for calibrating a flowmeter under test comprising the following steps performed in the order recited at a common site;
   connecting the flometer under test in series with a master flowmeter that has a more consistent response than the flowmeter under test;
   determining the K-factor of the master flowmeter with a small volume prover; and
   comparing the responses of the flowmeters to fluid flow therethrough to calculate the K-factor of the flowmeter under test.

22. A method for calibrating a flowmeter under test comprising, in the order recited, the steps of:
   connecting the flowmeter under test in series with a master flowmeter;
   determining the K-factor of the master flowmeter during the passage of a small volume of fluid flow through the flowmeters; and
   comparing the responses of the flowmeters during the passage of a large volume of fluid flow through the flowmeters to calculate the K-factor of the flowmeter under test.

* * * * *